(12) United States Patent
Hinkle

(10) Patent No.: US 9,804,978 B2
(45) Date of Patent: Oct. 31, 2017

(54) MEMORY SYSTEM FACILITATING HIGH BANDWIDTH AND HIGH CAPACITY MEMORY

(71) Applicant: Lenovo Enterprise Solutions (Singapore) Pte. Ltd., Singapore (SG)

(72) Inventor: Jonathan R. Hinkle, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 211 days.

(21) Appl. No.: 14/672,709

(22) Filed: Mar. 30, 2015

(65) Prior Publication Data
US 2016/0292095 A1   Oct. 6, 2016

(51) Int. Cl.
| H05K 7/10 | (2006.01) |
| G06F 13/16 | (2006.01) |
| G06F 13/40 | (2006.01) |
| G06F 13/42 | (2006.01) |
| G06F 3/06 | (2006.01) |

(52) U.S. Cl.
CPC .......... *G06F 13/1673* (2013.01); *G06F 3/061* (2013.01); *G06F 3/0635* (2013.01); *G06F 3/0683* (2013.01); *G06F 3/0688* (2013.01); *G06F 13/1678* (2013.01); *G06F 13/4068* (2013.01); *G06F 13/4265* (2013.01)

(58) Field of Classification Search
CPC ............ G06F 13/1673; G06F 13/1678; G06F 13/4068; G06F 3/0683; G06F 3/061; G06F 3/0635; G06F 3/0688; G06F 13/4265

USPC ......................................................... 710/301
See application file for complete search history.

(56) References Cited

U.S. PATENT DOCUMENTS

| 6,594,167 B1* | 7/2003 | Yamasaki ................. G11C 5/04 365/230.08 |
| 2008/0301352 A1 | 12/2008 | Bland et al. |
| 2009/0164672 A1 | 6/2009 | Bandholz et al. |
| 2010/0030942 A1* | 2/2010 | Hinkle ................. G06F 12/0607 711/5 |
| 2015/0254192 A1* | 9/2015 | Linstadt .................. G11C 7/10 711/103 |

* cited by examiner

Primary Examiner — Chun-Kuan Lee
(74) Attorney, Agent, or Firm — Jeffrey L. Streets

(57) ABSTRACT

A memory device and memory system using the memory device. The memory system includes a memory controller having a memory bus with a plurality of lanes, and a plurality of memory devices. Each memory device has a plurality of data pins and a plurality of detection circuits, wherein each detection circuit is coupled to one of the data pins to detect whether the data pin is coupled to one of the lanes of the memory bus. Each lane of the memory bus provides a point-to-point connection between the memory controller and exactly one of the device data lanes, wherein a subset of the data lanes of each memory device are coupled to one of the lanes of the memory bus. The memory capacity of a memory system may be increased by using more of the memory devices limited only by the width of the memory bus.

22 Claims, 12 Drawing Sheets

| # Lanes Connected | # Lanes Used | DL0 | DL1 | DL2 | DL3 | DL4 | DL5 | DL6 | DL7 |
|---|---|---|---|---|---|---|---|---|---|
| 1 | 1 | 0-7 | | | | | | | |
| 2-3 | 2 | 0,2,4,6 | 1,3,5,7 | | | | | | |
| 4-7 | 4 | 0,4 | 1,5 | 2,6 | 3,7 | | | | |
| 8-15 | 8 | 0 | 1 | 2 | 3 | 4 | 5 | 6 | 7 |

Datapath Mapping Table

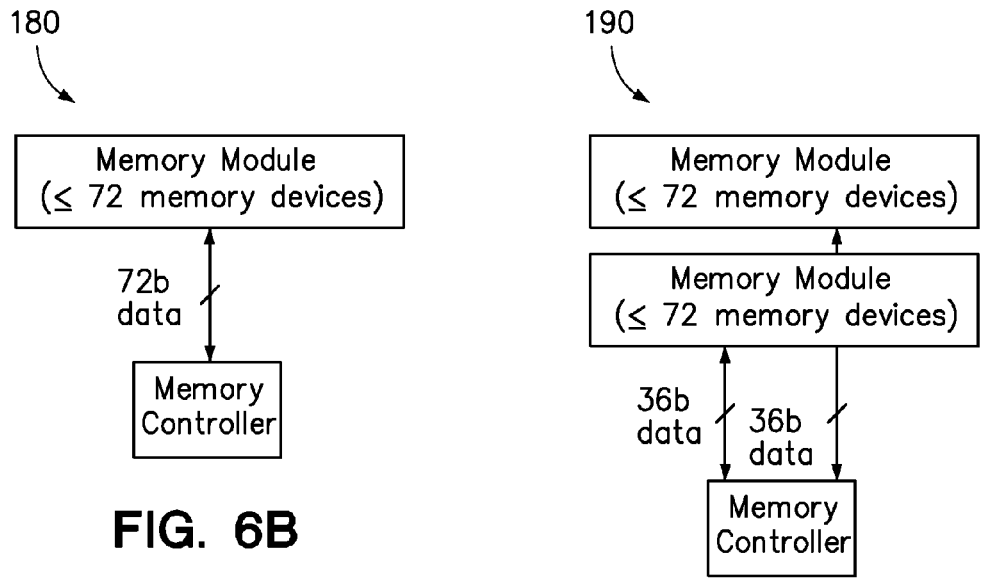
FIG. 6B
FIG. 6C
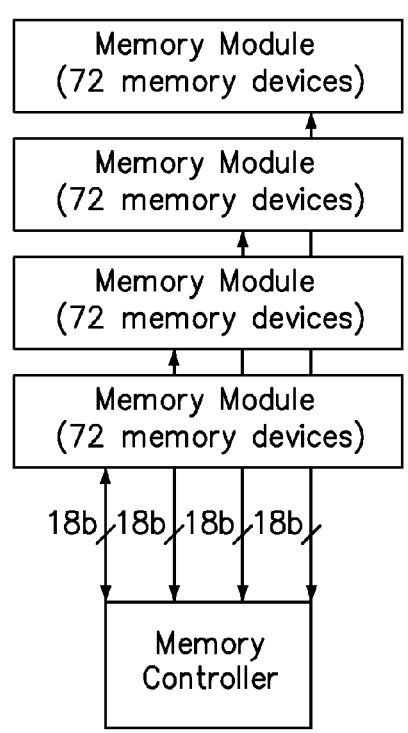
FIG. 6D

MEMORY SYSTEM FACILITATING HIGH BANDWIDTH AND HIGH CAPACITY MEMORY

BACKGROUND

Field of the Invention

The present invention relates to a computer memory system.

Background of the Related Art

In a computer, a memory controller contains the logic that enables reading and writing data to memory devices, such as a dual in-line memory module (DIMM) containing a number of dynamic random access modules (DRAM). The memory controller communicates with one or more memory devices over a number of conductive lines, collectively referred to as a "memory bus" having a bus width equal to the number of conductive lines. The memory controller also communicates with a processor over a "system bus" or "front-side bus." According to instructions received from the processor, the memory controller can write data received from the processor to the memory devices or read data from the memory devices for provision to the processor.

Currently, memory devices are most often coupled to the memory controller through an interface, such as DDR4. This interface provides connection to a single memory device, but also allows a wide, parallelized datapath and a common shared command, address and control path. These memory devices support standard computing applications which require a cache line access from multiple devices in parallel for error correction and reliability. Computer systems such as servers also need high bandwidth and low latency access to the memory devices along with the potential for a high capacity of memory. However, for any common fixed memory bus width, there is a design tradeoff between memory capacity (the amount of data that can be stored in memory) and bandwidth (the rate of data transfer to and from the memory). In other words, as memory capacity is increased, maintaining signal integrity on the memory bus often requires that the bandwidth be reduced. When increasing the number of memory devices to increase capacity, the capacitive loading on the bus increases and makes fast signaling more difficult. Conversely, maintaining signal integrity on the memory bus as bandwidth is increased generally requires reducing memory capacity or re-driving signals, which increases latency (the time delay to send or receive data). Both of these can significantly reduce system performance.

BRIEF SUMMARY

One embodiment of the present invention provides a computer memory system. The computer memory system comprises a memory controller coupled to a memory bus including a plurality of lanes, and a plurality of memory devices. Each memory device has a plurality of data pins and a plurality of detection circuits, wherein each detection circuit is coupled to one of the data pins to detect whether the data pin is coupled to one of the lanes of the memory bus. Each lane of the memory bus provides a point-to-point connection between the memory controller and exactly one of the memory device data lanes, wherein a subset of the plurality of data lanes of each memory device are coupled to the lanes of the memory bus.

Another embodiment of the present invention provides a memory device. The memory device comprises an array of memory cells for storing data, a plurality of data pins for communicating data with a memory controller over one or more data lane of a memory bus, and a plurality of detection circuits, wherein each detection circuit is coupled to the data pins of one lane to detect whether each memory device data lane is coupled to one of the lanes of the memory bus. The memory device also comprises a data buffer in communication with the array of memory cells for providing data to and from the array of memory cells, and a datapath mapping element coupled between the plurality of data pins and data buffers for transferring data between the data buffers and the device data lanes coupled one to one with lanes of the memory bus. The memory device further comprises a control circuit coupled to each detection circuit to identify the data pins that are coupled to one of the lanes of the memory bus, and wherein the control circuit is coupled to the datapath mapping element to cause the datapath mapping element to connect read and write data to the data buffers using a data stream having a bit width that is the same as the number of data lanes coupled to the lanes of the memory bus.

A further embodiment of the present invention provides a method comprising a memory controller determining, for each of a plurality of memory devices, a number of memory bus lanes coupled to the memory device, wherein each memory bus lane provides a point-to-point connection between the memory controller and exactly one memory device. The method further comprises the memory controller determining an addressing scheme as a function of the determined number of memory bus lanes coupled to each memory device, and the memory controller reading and writing data to and from the plurality of memory devices over the determined number of memory bus lanes and using the determined addressing scheme.

BRIEF DESCRIPTION OF THE SEVERAL VIEWS OF THE DRAWINGS

FIGS. 6B-6D are diagrams of a memory system including a memory controller and a 72 bit memory bus in communication with one, two and four memory modules, respectively, where each memory module has up to 72 memory devices.

DETAILED DESCRIPTION

Figure 1A:
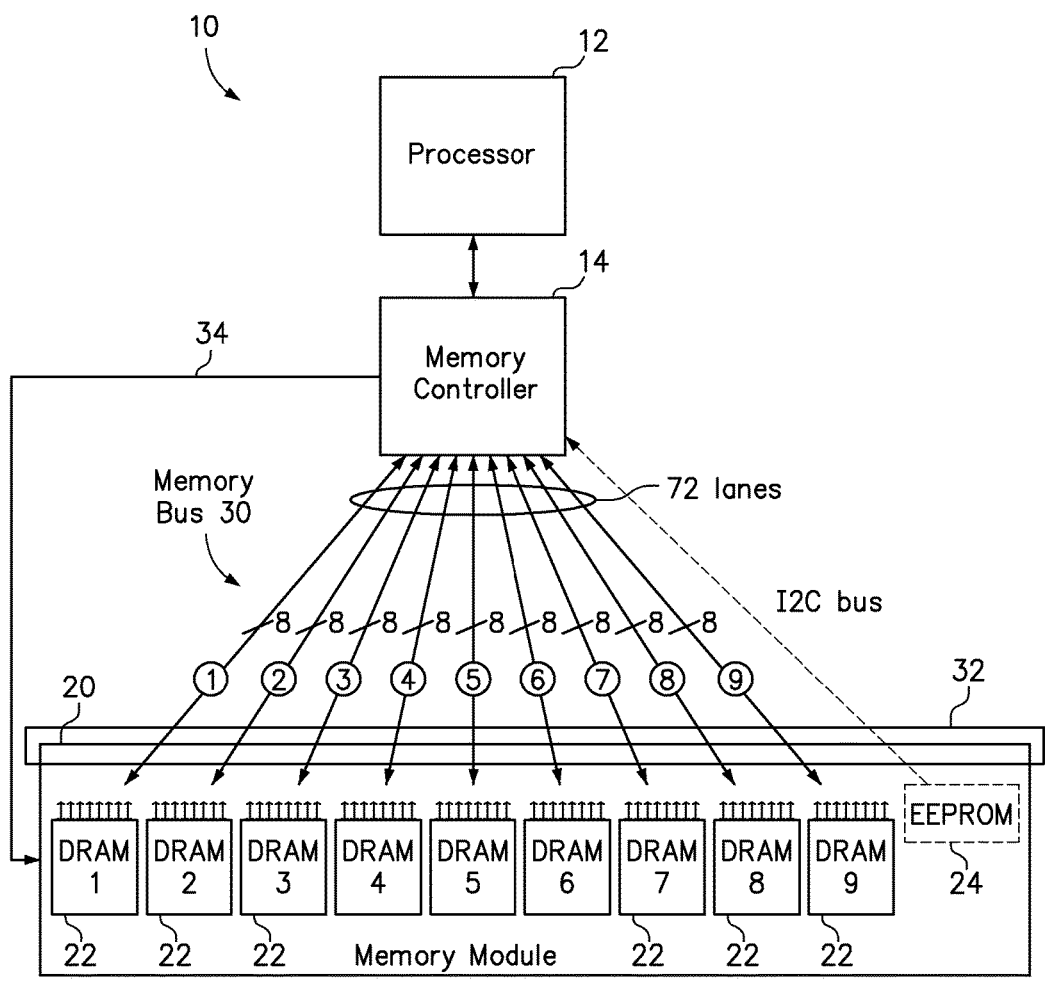
FIG. 1A is a diagram of a memory system including nine (9) memory devices.

One embodiment of the present invention provides a computer memory system. The computer memory system comprises a memory controller coupled to a memory bus including a plurality of lanes, and a plurality of memory devices forming a single rank. Each memory device has a plurality of data pins and a plurality of detection circuits, wherein each detection circuit is coupled to one of the data pins to detect whether the data pin is coupled to one of the lanes of the memory bus. Each lane of the memory bus provides a point-to-point connection between the memory controller and exactly one of the data pins, wherein a subset of the plurality of data pins of each memory device are coupled to one of the lanes of the memory bus.

The memory controller may be a standard memory controller that runs logic to implement the methods of the present invention. For example, the memory controller logic may detect or read the memory configuration and modify data transfer and addressing with the memory devices in consideration of the number of memory devices and the number of lanes coupled to each memory device. Optionally, the memory controller may obtain this information by reading an EEPROM associated with the memory, such as an EEPROM secured to a printed circuit board or memory module. Alternatively, the memory controller may perform its own detection or analysis of the memory configuration by interaction with the memory devices or reading a data I/O state register on each memory device.

The memory bus includes a plurality of data transmission lanes or simply "lanes" between the memory controller and the memory devices. Each lane of the memory bus may be a single ended line or a differential pair of lines allowing bidirectional communications. The number of lanes may be referred to as the "bus width." In accordance with various embodiments of the invention, the number of lanes of the memory bus is the only limit on the number of memory devices that the system can incorporate without resorting to logic buffering.

The memory devices on a single memory interface always form only a single rank, which means each lane of the memory bus directly communicates with only one memory device and the lane does not have branches. Having a point-to-point connection between the memory controller and exactly one set of the data pins of only one memory device provides improved signal integrity on the memory bus so that high bandwidths (i.e., high transmission frequencies over each lane) can be used without incurring frequent errors. Whereas electrical loading on a lane increases with an increasing number of ranks per memory module and an increasing number of memory modules per channel, embodiments of the present invention form only a single rank. And while memory systems of the present invention may use more than one memory module, the use of only point-to-point connections between the memory controller and exactly one of the data pins means that multiple memory modules do not cause the lanes to have branches. Non-limiting examples of memory devices include dynamic random access memory (DRAM) devices and non-volatile memory devices. Optionally, multiple memory devices may be incorporated in a package, such that the individual memory devices are stacked. Any of the memory devices may, for example, be secured to a printed circuit board via a ball grid array (BGA).

Embodiments of the memory devices may have a fixed number of data lanes coming from the memory silicon die, where those data lanes may be connected to a host system through the memory device pins or BGA. Each memory device may, for example, include up to 128 lanes per memory die, but preferably no less than 8 lanes per memory die. Due to memory device packaging costs, 16 lanes per memory device may be the most common. Many of the examples described below in reference to the Figures use memory devices with 8 lanes. However, the present invention is not limited to the number of lanes on a memory device.

Although much of the description of the present invention may refer to the memory devices as being secured to memory modules or include examples implemented with memory modules, it should be recognized that embodiments of the invention are equally applicable to memory devices that are secured to other types or configurations of printed circuit boards. For example, the same memory device configurations described in terms of memory modules may also be implemented on the same circuit board as the memory controller.

Embodiments of the memory device may include a datapath mapping element and a data buffer. The datapath mapping element transfers data to and from the data buffer using a number of bits that is the same as the number of detection circuits detecting that one of the data pins is coupled to one of the lanes of the memory bus, and the data buffer provides data to and from a memory array within the memory device. The datapath mapping element may include a number of interconnected multiplexers that, depending upon the number of lanes to be used in communications with the memory controller, are caused to direct data to an appropriate part of the data buffer.

Embodiments of the memory device may also include a control circuit coupled to each detection circuit to identify the data pins that are coupled to one of the lanes of the memory bus, wherein the control circuit is coupled to the datapath mapping element to control how the datapath mapping element reads and writes data to the data buffer. Preferably, the detection circuit includes a non-volatile memory element to store information identifying the data pins that are coupled to one of the lanes of the memory bus. The detection circuit is preferably used during initialization of the memory system and the identity and number of lanes detected as being coupled to the memory controller is stored for use across numerous restarts.

Another embodiment of the present invention provides a memory device. The memory device comprises an array of memory cells for storing data, a plurality of data pins for communicating data with a memory controller over one or more data lane of a memory bus, and a plurality of detection circuits, wherein each detection circuit is coupled to one of the data pins to detect whether the data pin is coupled to one of the lanes of the memory bus. The memory device also comprises a data buffer in communication with the array of memory cells for providing data to and from the array of memory cells, and a datapath mapping element coupled between the plurality of data pins and the data buffer for transferring data between the data buffer and the data pins coupled to one of the lanes of the memory bus. The memory device further comprises a control circuit coupled to each detection circuit to identify the data pins that are coupled to one of the lanes of the memory bus, and wherein the control circuit is coupled to the datapath mapping element to cause the datapath mapping element to read and write data to the data buffer using a data stream having a bit width that is the same as the number of data pins coupled to one of the lanes of the memory bus. In a first option, the memory devices may be selected from dynamic random access memory devices and non-volatile memory devices. In a second option, the control circuit may include a non-volatile memory element for storing information identifying the data pins that are coupled to one of the lanes of the memory bus.

A further embodiment of the present invention provides a method comprising a memory controller determining, for each of a plurality of memory devices, a number of memory bus lanes coupled to the memory device, wherein each memory bus lane provides a point-to-point connection between the memory controller and exactly one memory device. The method further comprises the memory controller determining an addressing scheme as a function of the determined number of memory bus lanes coupled to each memory device, and the memory controller reading and writing data to and from the plurality of memory devices over the determined number of memory bus lanes and using the determined addressing scheme. In preferred embodiments, the memory controller communicates with each memory device without using a chip select signal.

In various embodiments, the method further comprises each memory device identifying a subset of data pins on the memory device that are coupled to one of the lanes of the memory bus, and each memory device buffering data in and out of the memory device according to the number of data pins in the identified subset of data pins. Preferably, the subset of data pins on the memory device that are coupled to one of the lanes of the memory bus will be 1 data pin, 2 data pins, 4 data pins, 8 data pins, or 16 data pins. However, if the number of data pins in the subset is not one of these numbers, then the number of the connected data pins that are actually used is preferably 1 data pin, 2 data pins, 4 data pins, 8 data pins, or 16 data pins. For example, if 5 data pins are connected, then the memory device would preferably only use 4 of the data pins for passing data to and from the memory controller.

In another embodiment of the method, the memory controller may read an electronically erasable programmable read-only memory (EEPROM) on one or more memory module securing the plurality of memory devices, wherein the EEPROM stores information characterizing the capacity of the memory module. For example, the EEPROM may be loaded with the information by the manufacturer of the memory module. Optionally, the memory controller may read the information on the EEPROM over an inter-integrated circuit (I2C) bus. The memory controller uses the information, such as the number of memory devices and the number of lanes on each memory device, to determine how to send and address data to and from the memory devices. However, even when the memory module includes an EEPROM describing the memory devices, the individual memory devices may still benefit from having a lane detector since the width of a memory bus (and therefore the number of lanes coupled to each memory device) may vary among different computer systems in which the memory module may be installed.

Various embodiments of the present invention provide a memory system with flexibility in bandwidth, capacity, and speed of operation. For example, increases in memory capacity may be achieved without resulting in signal integrity issues that would require a reduction in bandwidth or an increase in latency. In this new topology, the memory interface bit width to each memory device may be varied depending on the desired memory capacity of the memory module. For example, with 9 memory devices on a memory module, each memory device could have 8 lanes (i.e., 8-data bits wide) such that the memory module has 72 lanes (i.e., 72-data bits wide) if desired. If a memory module capacity had 72 memory devices, each memory device could have 1 lane (i.e., a 1-bit wide interface) to make up the full bus width of 72 bits. Thus, the bandwidth (and latency) of the interface to the memory does not have to change across different memory capacities. The signal integrity would also be consistent since the same 1:1 point-to-point interconnect would be maintained, regardless of module capacity. This topology may also be implemented using through silicon vias (TSV) and three-dimensional stacking (3DS) technologies, since each memory die can be directly connected to a lane for communication with the memory controller. The memory controller and interface definition enables scaling to occur without modular ranking schemes that often cause performance issues.

Still further embodiments of the present invention may incorporate logic buffering in order to further increase the memory capacity of the memory system. For example, a load reduction dual in-line memory module (LRDIMM) includes buffers that allow greater total memory capacity while adding some latency. An address bit may be used to instruct the LRDIMM to transfer data to or from one of multiple memory devices.

FIG. 1A is a diagram of a memory system 10 including a processor 12, a memory controller 14, and a memory module 20. The memory controller 14 transfers data to and from the memory module 20 over a memory bus 30 to satisfy write and read command received from the processor 12. As shown in this example, the memory bus 30 has a total of seventy-two (72) lanes communicating with the memory module 20. The memory module 20 has nine (9) memory devices (DRAM 1-9) 22, where each memory device 22 is an 8-lane memory device (i.e., has 8 data pins), and where each lane of each memory device 22 is coupled to a lane of the memory bus 30. The lanes of the memory bus 30 that are directed to each memory device 22 are shown schematically as a single line (i.e., 8 lanes directed to DRAM 1 are represented by the single line 1). Accordingly, the memory bus width of 72 lanes communicates with 9 memory devices using 8 lanes per memory device. An address bus 34 is also provided between the memory controller 14 and the memory module 20.

It should be recognized that the memory module 20 may have an edge connector with 72 contacts that come into communication with the memory bus 30 when the edge connector is seated into a socket 32 on a printed circuit board. As shown, the memory controller 14 can communicate over an I2C bus with an optional EEPROM 24 secured to the memory module 20.

Figure 1B:
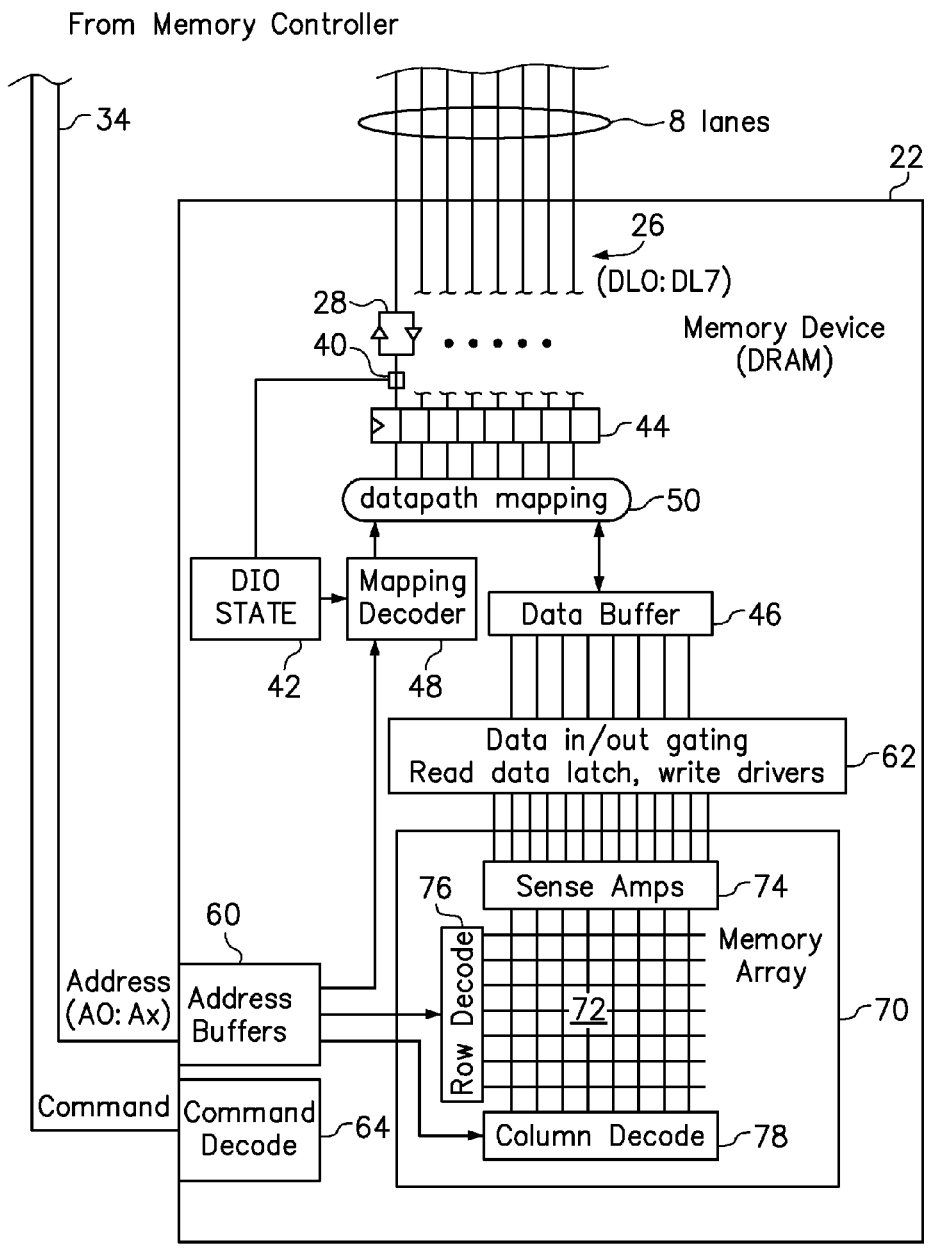
FIG. 1B is a diagram of a memory device that may be used in the memory system.

FIG. 1B is a diagram of a memory device 22 that may be used in the memory system. The memory device 22 has 8 data lanes 26 that are available to connect one to one with lanes of the memory bus. Each of the data lanes 26 includes a transmitter and receiver pair 28 and a detector 40. The detector 40 associated with each data lane 26 provides a signal to a data input-output state (DIO State) control circuit 42.

The detector 40 may detect a signal on a data I/O pin in response to the memory controller sending data or signals on all the data I/O lanes connected to the memory controller, such that the memory devices can detect which of their data pins are connected to the memory controller. For example, the memory device could detect which bits in the last-stage register are set with pre-defined values as a result of receiving the signals from the memory controller. In the absence of a last-stage register, the memory device could have all data IO receivers directly mapped to register and then detect which bits are set with pre-defined values. Still further, the memory device or detector could look for an expected analog signature driven from the memory controller on all data IO pins to determine which data IO pins are connected.

The detection of connected data lanes and the setting of the DIO State, including the number of lanes to be used, may occur during system power on and initialization and may be statically allocated during run-time. To enable proper interoperability for persistent memories and for design simplification, the DIO State may be kept the same, for example by using non-volatile memory, after the DIO State is set the first time, unless the memory controller sends a specific command to re-detect or reset the DIO State. The memory controller may set the DIO State or have the memory device re-detect and set the DIO State, especially when memory hardware is being installed for the first time and there's no saved data on the device.

Figure 8:
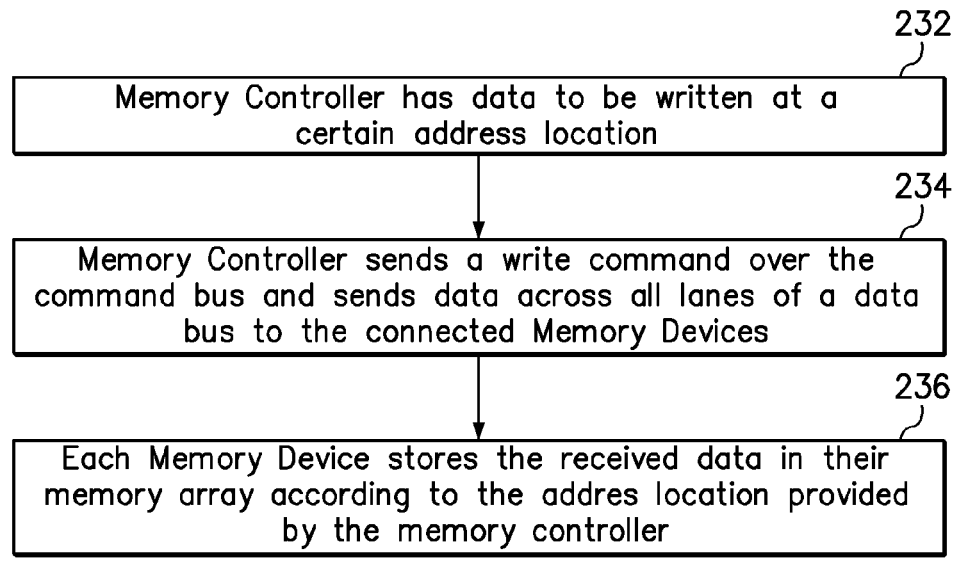
FIG. 8 is a flowchart of a method of writing data to the plurality of memory devices in a memory system.

As shown, a last-stage register 44 holds data being transferred into or from the memory device 22. The number of bits transferred into or from the register 44 of the memory device depends upon the number of lanes of the memory bus being used for communication with the memory device 22. In the example of FIG. 1B, 8 lanes of the data pins 26 are coupled to 8 lanes of the memory bus, such that the register 44 will hold 8 bits at a time.

A datapath mapping element 50 is coupled between the last-stage register 44 and a data buffer 46 and controls how bits from the register 44 are directed or mapped to the data buffer 46. The operation of the datapath mapping element 50 is controlled by a mapping decoder 48, which receives input from both the DIO State control circuit 42 and an address buffer 60. When the data buffer 46 has received a set of data ready to be written, a data in/out gating component 62, which includes the read data latch and write drivers, passes the data to a memory array 70.

The last-stage register 44 is disposed between the datapath mapping device 50 and the I/O drivers 28. Accordingly, each bit read from the memory array 70 may be driven through the last-stage register 44 before going to I/O drivers 28, and each bit to be written to the memory array 70 may be received in the last-stage register 44 before being transferred into the data buffer 46. Only that portion of the last-stage register 44 that is connected to the memory bus and used for communication with the memory controller will receive data bits. The rest of the last-stage registers will go unused and may be powered down.

The memory array 70 is a standard memory array, including memory cells 72, sense amps 74, a row decoder 76, and a column decoder 78. The row decoder 76 and the column decoder 78 are controlled by the command decoder 64 and provided address bits from the address buffer 60 in accordance with an address received from the memory controller over the address bus 34. Accordingly, the memory controller can read data from or write data to a specific address of the memory array.

Figures 1C, 1D:
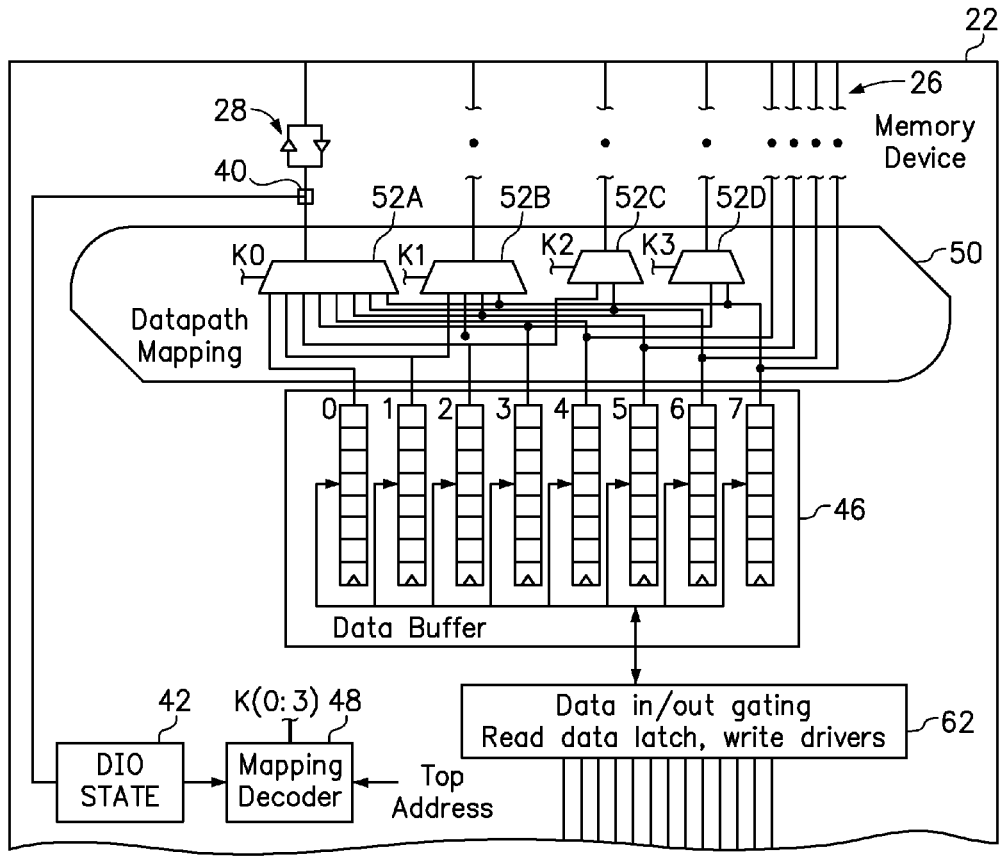
FIG. 1C is a schematic diagram of a portion of the memory device of FIG. 1B showing greater detail of a datapath mapping element and the buffer.
FIG. 1D is a datapath mapping table illustrating how data bits are mapped to a buffer as a function of the number of data lanes connected to the memory device.

FIG. 1C is a schematic diagram of a portion of the memory device 22 of FIG. 1B showing greater detail of the datapath mapping element 50 and the data buffer 46 for an 8-lane memory device. In this non-limiting example, the datapath mapping element 50 includes a set of four multiplexers 52A-D and input from each of the data pins 26 (dq0:dq7). The configuration of the multiplexers 52A-D, the data pins 26, and the outputs from the multiplexers and data pins provide data to the data buffer 46 in accordance with the number of data pins 26 that are being used.

In operation, the detector 40 detects whether or not there is a signal from the memory controller on each data I/O pin 26 (dq0:dq7) of the memory device 22 and provides signals to the DIO State control circuit 42 in order to store information identifying the data I/O pins that are connected to the memory controller the "DIO State") in a nonvolatile memory device. Optionally, all data pins that are connected to the memory controller are not used, and the DIO state control circuit 42 may store information identifying the data pins that are actually being used, not just connected, for communication with the memory controller.

The operation of the multiplexers 52A-D, and therefore the operation of the datapath mapping element 50, is controlled by the mapping decoder 48, which receives input from both the DIO State control circuit 42 and an address buffer 60 (See FIG. 1B). Accordingly, the mapping decoder 48 provides four output signals (K0:K3), such that one signal goes to each of the four multiplexers 52A-D.

The data buffer 46 includes a set of buffers, where the number of buffers is equal to the maximum data I/O width of the memory device (illustrated as numbered columns 0-7). The memory device 22 will only connect these buffers to the data lanes connected and used for communication with the memory controller.

FIG. 1D is a datapath mapping table 80 illustrating how the datapath mapping element 50 maps data bits to the buffer 46 as a function of the number of data lanes being used by the memory device 22. As previously described, the number of data pins 26 in use may be detected by the detectors 40 and provided to the DIO State control circuit 42 for storage. The datapath mapping table 80 stores the number of connected lanes in a first column 81 and the number of lanes being used in the second column 82. The datapath mapping table 80 then includes a separate column (columns 83-90) for each of the data lanes 0-7 (here labeled DL0:DL7).

Preferably, embodiments of the present invention will use only 1, 2, 4, 8, etc. lanes. Accordingly, the table 80 shows that if 2-3 lanes are "connected", then only 2 lanes will be "used." Similarly, if there are 4-7 lanes connected, then only 4 lanes are used. This principle may be carried out for any number of connected lanes.

The table 80 shows that if only 1 data lane is being used (i.e., only lane DL0), all of the buffers may be chosen (according to address bits) to be connected to the DL0 for data transmission. If 2 data lanes are being used, then buffers 0,2,4, and 6 may be connected to DL0 and buffers 1,3,5, and 7 may be connected to DL1 (see columns 83 and 84). In other words, as selected by address bits, data lane 0 (DL0; column 83) will receive or send data from read and write buffers 0,2,4, and 6, while data lane 1 (DL1; column 84) will receive or send data from read and write buffers 2,3,5, and 7. Still further, if 4 data IO lanes are being used, then bits of data are read or written simultaneously as selected between the four data lanes 0-3. Specifically, as selected by address data lane 0 (DL0; column 83) may be connected to buffers 0 and 4, data lane 1 (DL1; column 84) may be connected to buffers 1 and 5, data lane 2 (DL2; column 85) may be connected to buffers 2 and 6, and data lane 3 (DL3; column 84) may be connected to buffers 3 and 7. This principle may be carried out for any number of lanes being used. As read and write operations are performed, bits are delivered or received to/from their appropriate buffer registers to the appropriate DL bits.

Figure 2A:
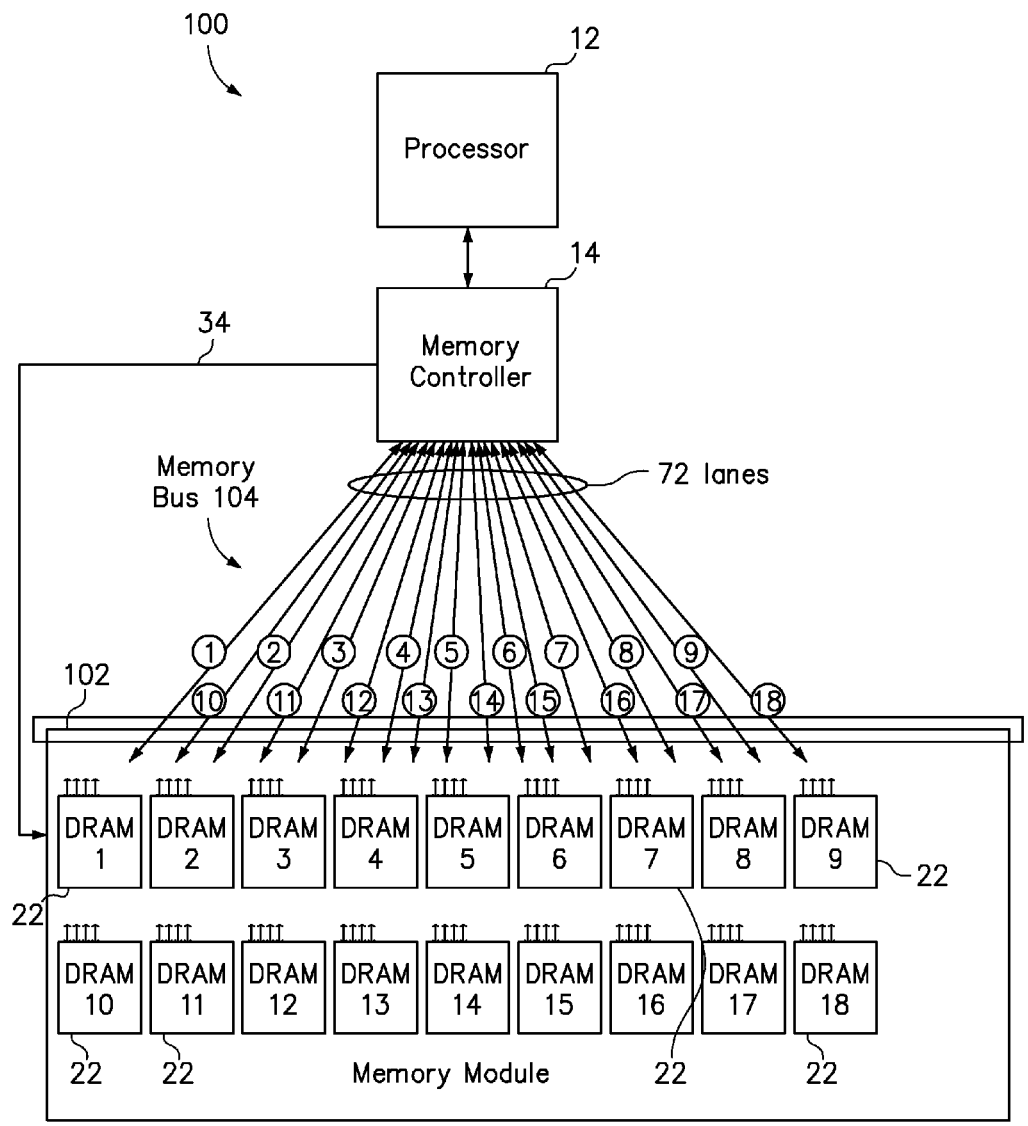
FIG. 2A is a diagram of a memory system including eighteen (18) memory devices.

FIG. 2A is a diagram of a memory system 100 including eighteen (18) memory devices 22 on a memory module 102. The processor 12, memory controller 14, address bus 34, and memory bus 104 are the same as the corresponding elements in FIG. 1A, except that the 72 lanes of memory bus 104 are shared by the 18 memory devices 22. Accordingly, each of the 18 memory devices 22 in FIG. 2A have only 4 lanes connected to the memory bus 104, whereas the 9 memory devices 22 in FIG. 1A have 8 lanes connected to the memory bus 30.

Referring back to FIGS. 1B-D, it should be understood that the memory device 22 is the same, but will function differently when only 4 lanes are connected and used. Specifically, the DIO State 42 will reflect the use of 4 certain lanes, such that the mapping decoder 48 will modify the control of the multiplexers 52A-D of the datapath mapping element 50. As a result, the datapath mapping element 50 will, in accordance with the datapath mapping table 80, direct data to the appropriate buffers 26 (DL0:DL3).

Figure 2B:
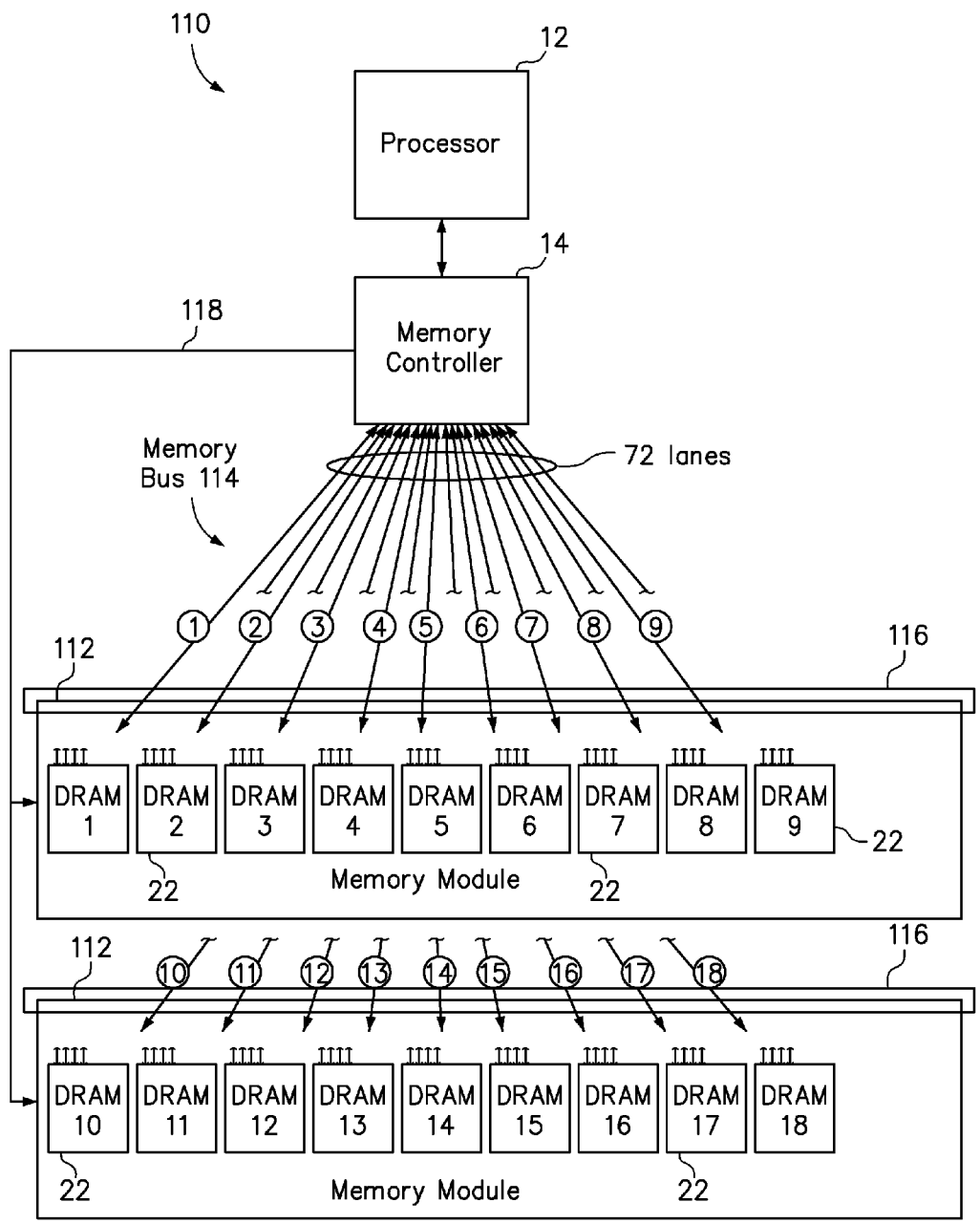
FIG. 2B is a diagram of a memory system including eighteen (18) memory devices, with nine (9) memory devices on each of two separate memory modules.

FIG. 2B is a diagram of a memory system 110 including eighteen (18) memory devices 22 on two memory modules 112 (i.e., 9 memory devices per memory module). The memory system 110 is the same as memory system 100 in FIG. 2A, except that the 18 memory devices 22 are separated among two memory modules and the 72 lanes of the memory bus 114 are separate among two sockets 116. This configuration still uses a single rank and a single channel with all point-to-point connection, but a first half of the point-to-point connections (36 lanes; 4 lanes for each of 9 devices) pass through a first socket 116 to a first memory module 112 having 9 memory devices 22 and a second half of the point-to-point connections (36 lanes; 4 lanes for each of 9 devices) pass through a second socket 116 to a second memory module 112 having 9 memory devices 22. Note also that the address bus 118 must extend to both memory modules 112.

Figure 3:
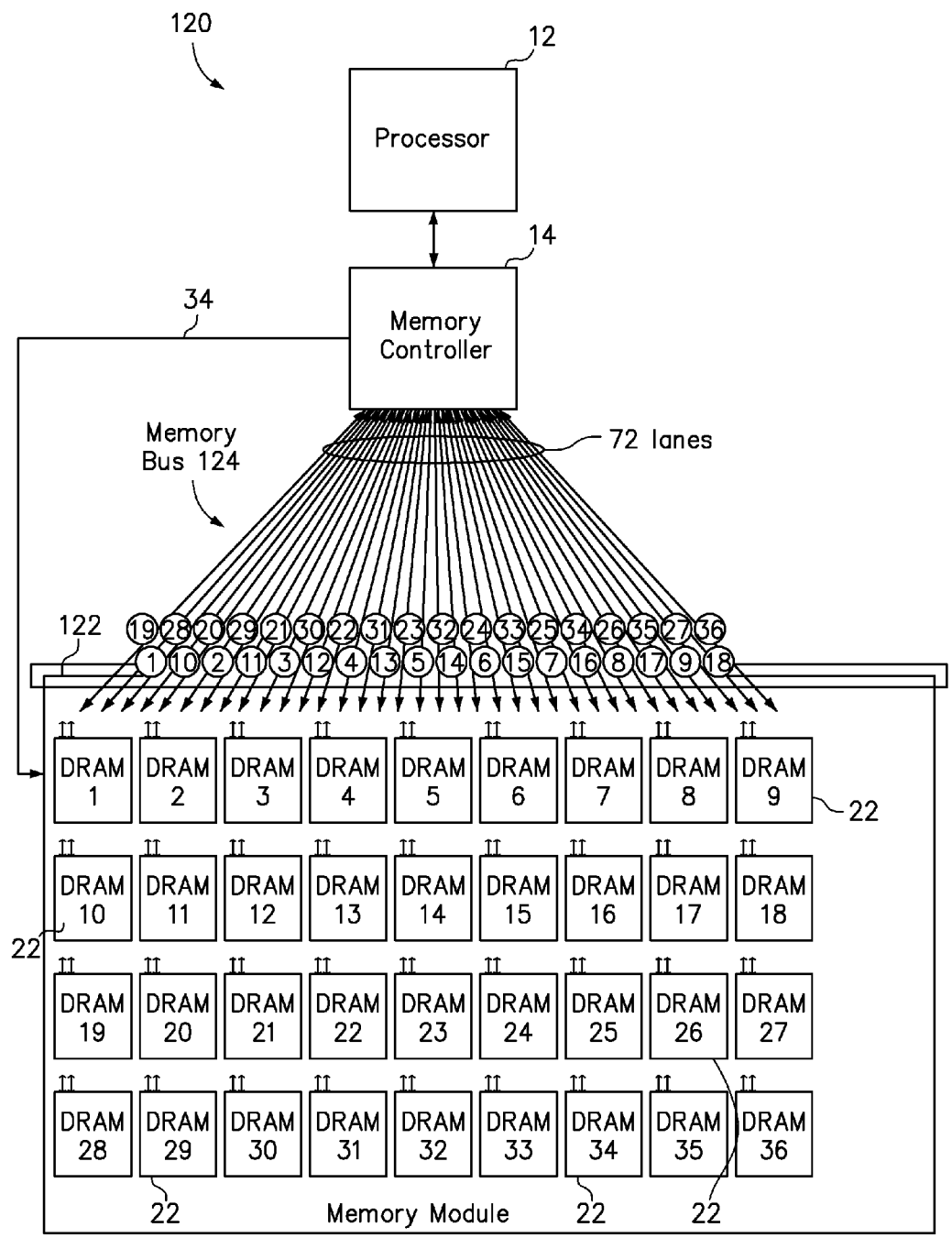
FIG. 3 is a diagram of a memory system including thirty-six (36) memory devices.

FIG. 3 is a diagram of a memory system 120 including thirty-six (36) memory devices 22 on a memory module 102. The processor 12, memory controller 14, address bus 34, and memory bus 124 are the same as the corresponding elements in FIGS. 1A and 2A, except that the 72 lanes of memory bus 124 are shared by the 36 memory devices 22. Accordingly, each of the 36 memory devices 22 in FIG. 3 have only 2 lanes connected to the memory bus 124, whereas the 9 memory devices 22 in FIG. 1A have 8 lanes connected to the memory bus 30 and the 18 memory devices 22 in FIG. 2A have 4 lanes connected to the memory bus 104.

Referring back to FIGS. 1B-D, it should be understood that the memory devices 22 shown in FIG. 3 are the same, but will function differently when only 2 lanes are connected and used with each memory device. Specifically, the DIO State 42 will reflect the use of 2 lanes, such that the mapping decoder 48 will modify the control of the multiplexers 52A-D of the datapath mapping element 50. As a result, the datapath mapping element 50 will, in accordance with the datapath mapping table 80, direct data from the appropriate buffers to the two data lanes 26 (DL0:DL1).

Figure 4A:
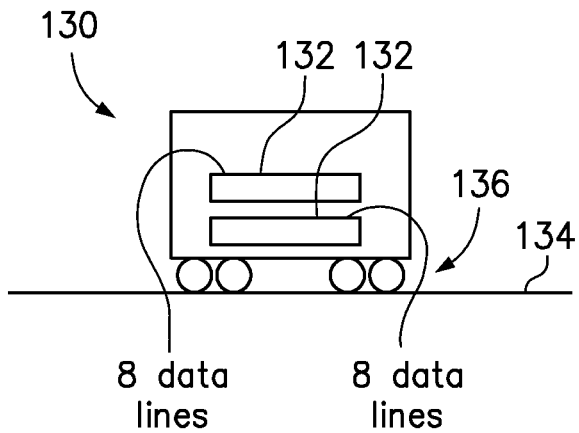
FIGS. 4A-4C are diagrams of packages that include two, four and eight memory devices, respectively.
Figure 4B:
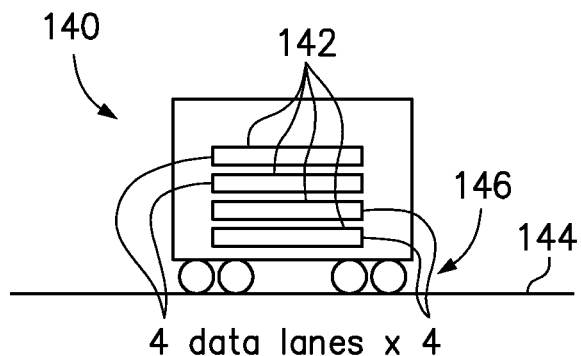
Figure 4C:
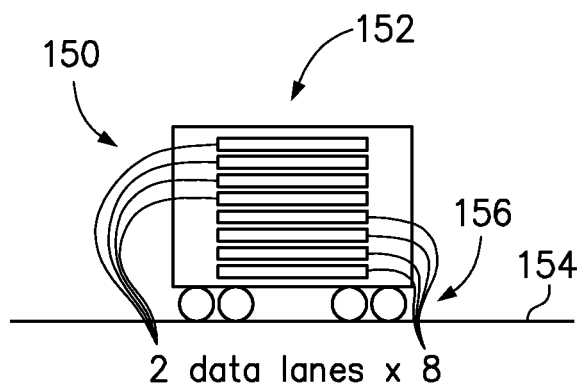

FIGS. 4A-4C are diagrams of a package including two, four and eight memory devices, respectively. FIG. 4A shows a package 130 including 2 memory die 132 that are functionally the same as the memory device 22 of the previous Figures. The 2 memory die 132 are connected to a printed circuit board 134 using a ball grid array (BGA) 136 including a ball for each electrical connection between a data pin and (directly or indirectly) a lane of the memory bus. As shown, each memory device 132 extends 8 of its data pins (data lanes) to the printed circuit board 134.

FIG. 4B shows a package 140 including 4 memory die 142 that are functionally the same as the memory device 22 of the previous Figures. The 4 memory die 142 are connected to a printed circuit board 144 using a bait grid array (BGA) 146 including a ball for each electrical connection between a data pin and (directly or indirectly) a lane of the memory bus. As shown, each memory device 142 extends 4 of its data pins (data lanes) to the printed circuit board 144.

FIG. 4C shows a package 150 including 8 memory die 152 that are functionally the same as the memory device 22 of the previous Figures. The 8 memory die 152 are connected to a printed circuit board 154 using a ball grid array (BGA) 156 including a ball for each electrical connection between a data pin and (directly or indirectly) a lane of the memory bus. As shown, each memory device 152 extends 2 of its data pins (data lanes) to the printed circuit board 154.

Figure 5:
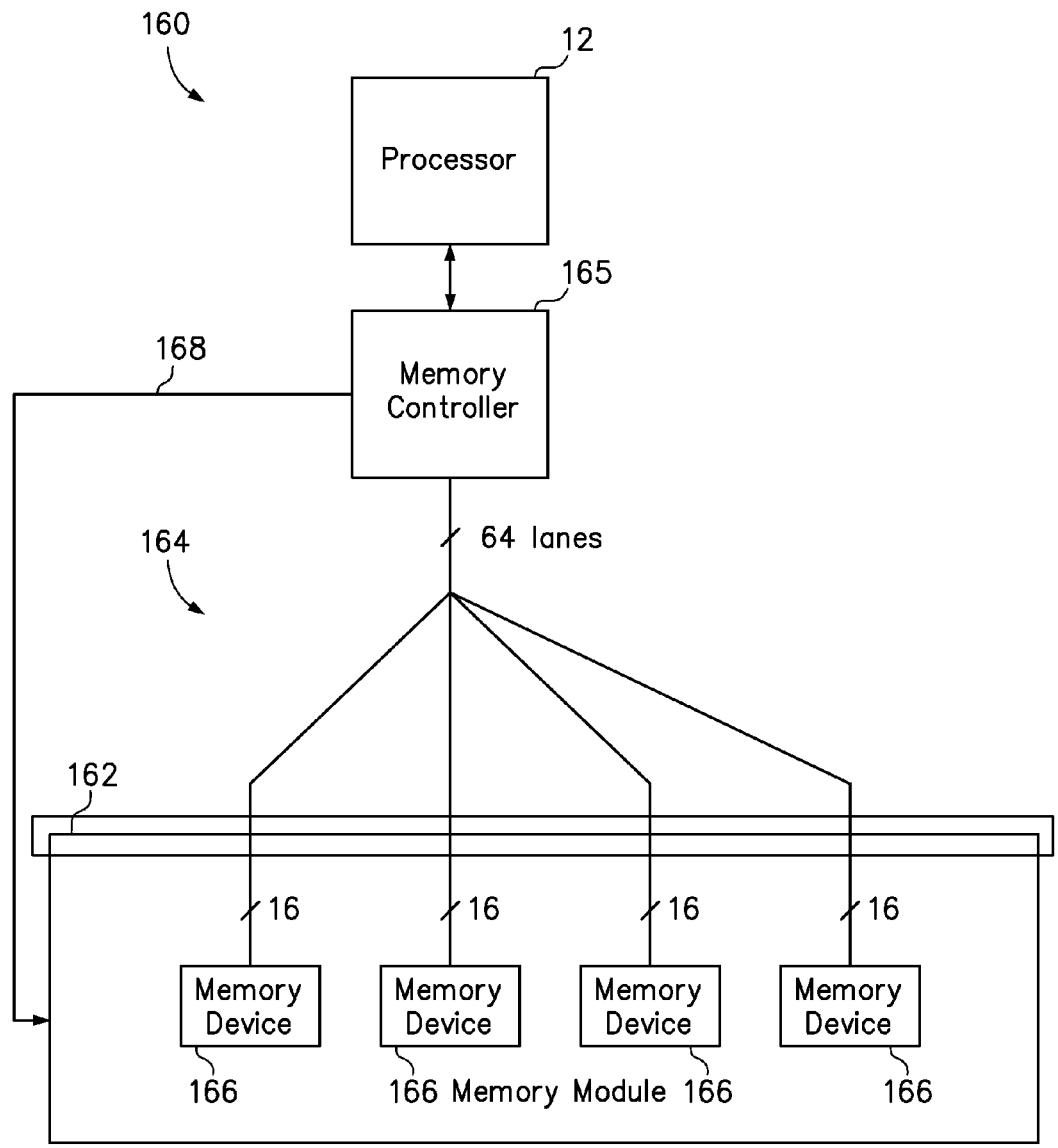
FIG. 5 is a diagram of a memory system including a memory controller and a 64 bit memory bus in communication with four (4) memory devices.

FIG. 5 is a diagram of a memory system 160 including a memory module 162 having four (4) memory devices 166. The processor 12 and the memory controller 165 are the same as the corresponding elements in FIGS. 1A and 2A, except that the memory controller 165 supports 64 lanes on the memory bus 164. Those 64 lanes are shared by the 4 memory devices 166, such that each memory device 166 uses 16 lanes. The structures and principles described previously in the context of particular memory bus widths and maximum memory device lanes are equally applicable to the configuration of memory system 160.

Figure 6A:
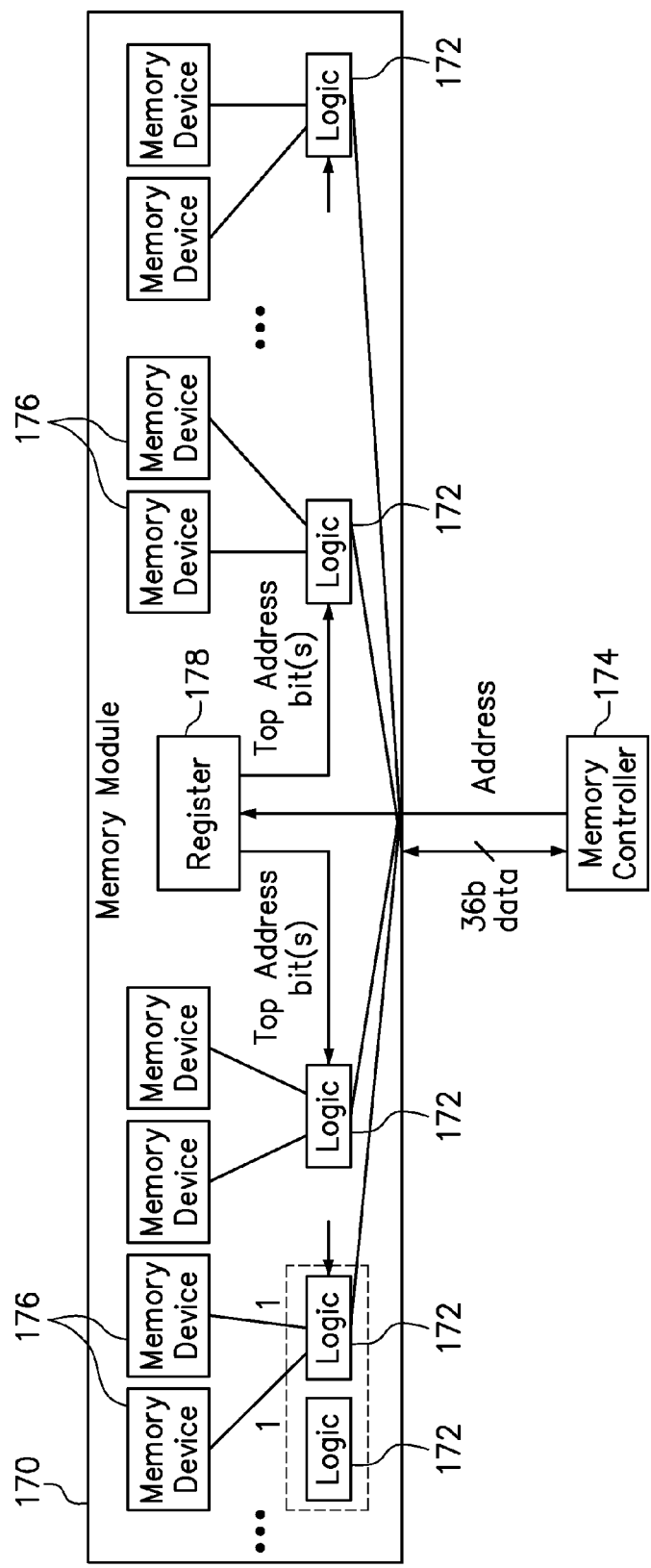
FIG. 6A is a diagram of a memory module including logic buffers to enable further expansion of a data bus on the memory module.

FIG. 6A is a diagram of a memory module 170 including logic buffers 172 to enable further expansion of a data bus on the memory module. The use of logic buffers enables more than one device per data IO lane. In this example, 36 data IO lanes are driven from the memory controller 174 to the single memory module 170, but may be expanded to 72 memory devices 176 (not all shown) using 2:1 logic buffering as illustrated. Here, a top address bit determines which of two memory device 176 connected to the same logic buffer 172 will be for placed in communication with the memory controller 174. As shown, a register 178 on the memory module 170 receives and re-drives address signals from the memory controller 174. In this case, the top address bit is driven to the logic buffers 172 to instruct the logic buffers 172 which of its two connected memory devices 176 to connect with the memory controller 174. Only the one top bit of address would be used for 2:1 logic buffering.

Other ratios and widths of logic buffering may also be implemented, such as 4:1 logic buffering providing 18 data IO lanes to 72 devices or 4:1 logic buffering providing 36 data IO lanes to 144 devices, etc. A 4:1 logic buffering would require two bits of address so that the logic buffer could determine which memory device to connect to the memory controller. These logic buffers could also be inside the multi-memory die packages and all of the addressing work could be done internally to the memory device package.

FIG. 6B is a diagram of a memory system 180 including a memory controller and a 72 bit memory bus in communication with a memory module having up to 72 memory devices. With 72 memory devices, each memory device may be connected to one lane of the memory bus, such that there is no need for the use of logic buffers.

FIG. 6C is a diagram of a memory system 190 including a memory controller and a 72 bit memory bus in communication with two memory modules that each have up to 72 memory devices. Each memory module is in communication with the memory controller over 36 lanes of the memory bus. If each memory module has 72 memory devices, then both memory modules may use 2:1 logic buffering as described in reference to FIG. 6A.

FIG. 6D is a diagram of a memory system 200 including a memory controller and a 72 bit memory bus in communication with four memory modules that each have 72 memory devices. Each of the four memory modules uses 18 lanes of the memory bus, which requires using 4:1 logic buffering. Accordingly, each memory module may include 18 logic buffers, with 4 memory devices connected to each logic buffer. Two address bits may be used to indicate which of the 4 memory devices should be used at any particular time.

Figure 7:
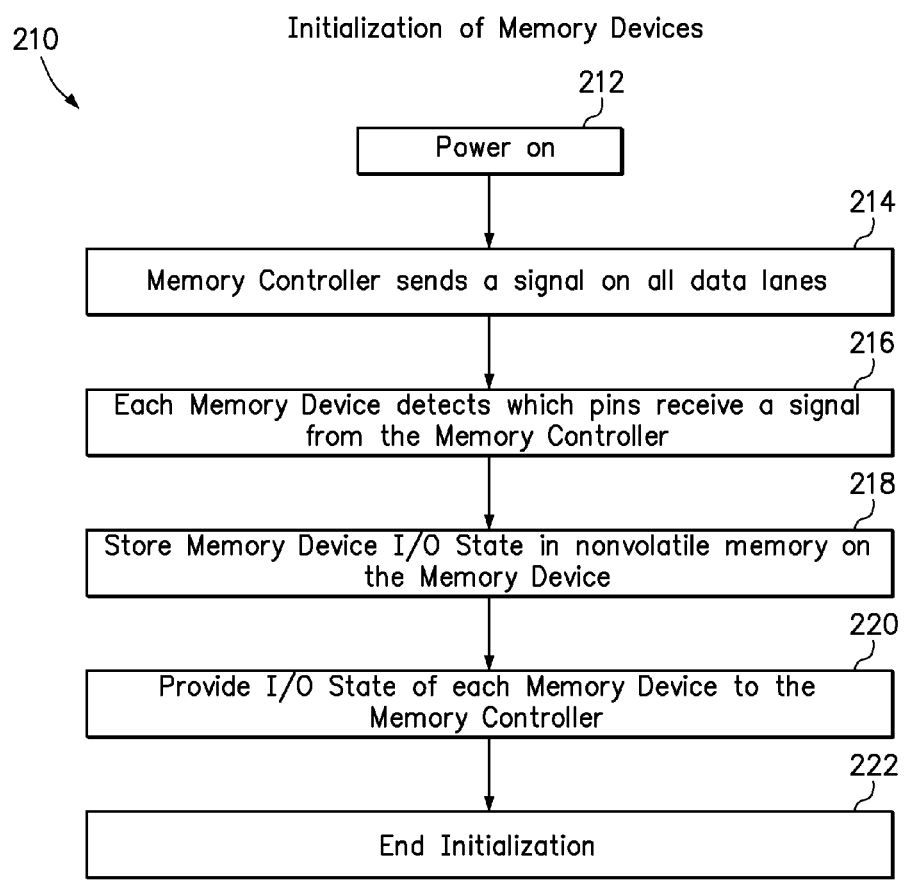
FIG. 7 is a flowchart of a method of initializing memory devices and the memory controller.

FIG. 7 is a flowchart of a method 210 of initializing memory devices and the memory controller. In step 212, the computer system power is turned on. In step 214, the memory controller sends a signal on all data lanes of the memory bus. Each memory device then detects which pins receive a signal from the memory controller in step 216, and stores the memory device I/O state in non-volatile memory on the memory device in step 218. In step 220, the I/O state of each memory device is provided to the memory controller. The I/O state could be the same information that was detected by each memory device or the I/O state may be static information stored in an EEPROM secured to the memory module or printed circuit board associated with the memory devices. In step 222, the initialization of the memory system ends.

FIG. 8 is a flowchart of a method 230 of writing data to the plurality of memory devices in a memory system. In step 232, the memory controller has data to be written at a certain address location and, in step 234, the memory controller sends a write command over the command bus and the sends data across all lanes of a data bus to the connected memory devices. In step 236, each memory device stores the received data in their memory array according to address location provided by the memory controller.

Figure 9:
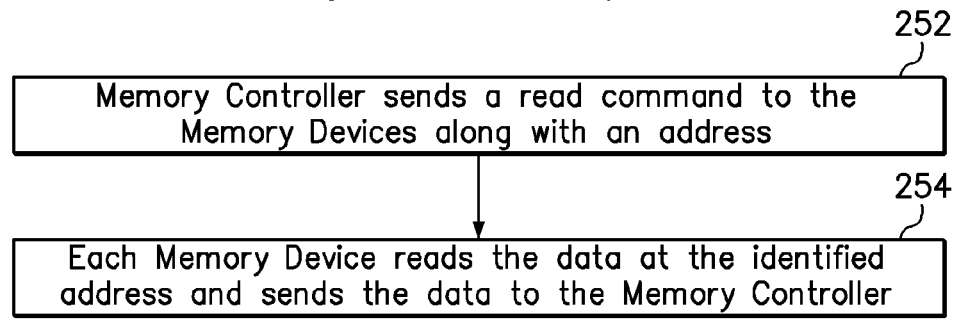
FIG. 9 is a flowchart of a method of reading data from the plurality of memory devices in a memory system.

FIG. 9 is a flowchart of a method 250 of reading data from the plurality of memory devices in a memory system. In step 252, the memory controller sends a read command to the memory devices along with an address. In step 254, each memory device reads the data at the identified address and sends the data to the memory controller.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved, it will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer memory system, comprising:
   a memory controller coupled to a memory bus including a plurality of lanes; and
   a plurality of memory devices, each memory device having a plurality of data lanes and a plurality of detection circuits, and each detection circuit being coupled to one of the data lanes to detect whether the data lane is coupled to one of the lanes of the memory bus;
   wherein each lane of the memory bus provides a point-to-point connection between the memory controller and exactly one of the data lanes, wherein each lane of the memory bus has no branch extending from the lane, and wherein a subset of the plurality of data lanes of each memory device are coupled one to one with lanes of the memory bus.

2. The computer memory system of claim 1, wherein each lane comprises a single bi-directional differential pair.

3. The computer memory system of claim 1, wherein each lane comprises a first uni-directional differential pair used for receiving (Rx) and a second uni-directional differential pair used for transmitting (Tx) data.

4. The computer memory system of claim 1, wherein each lane comprises multiple encoded electrical connections that together provide bi-directional transfer of data.

5. The computer memory system of claim 1, wherein each lane comprises separate uni-directional sets of multiple encoded electrical connections that together provide bi-directional transfer of data.

6. The computer memory system of claim 1, wherein each memory device includes a datapath mapping element and a data buffer, wherein the datapath mapping element transfers data to and from the data buffer using a number of bits that is the same as the number of detection circuits detecting that one of the data pins is coupled to one of the lanes of the memory bus, and wherein the data buffer provides data to and from a memory array within the memory device.

7. The computer memory system of claim 1, wherein each memory device includes a datapath mapping element and a data buffer, wherein each memory device includes a circuit coupled to each detection circuit to identify the data pins that are coupled to one of the lanes of the memory bus, and wherein the circuit is coupled to the datapath mapping element to control how the datapath mapping element connects data lanes for reads and writes data to the data buffer.

8. The computer memory system of claim 7, wherein the circuit includes a non-volatile memory element to store information identifying the data lanes that are coupled to one of the lanes of the memory bus.

9. The computer memory system of claim 8, wherein each memory module includes an EEPROM storing data characterizing the capacity of the memory module.

10. The computer memory system of claim 1, wherein the plurality of memory devices and the memory controller are secured to the same circuit board.

11. The computer memory system of claim 1, wherein the plurality of memory devices are secured to a single memory module.

12. The computer memory system of claim 1, wherein the plurality of memory devices are secured to a plurality of memory modules.

13. The computer memory system of claim 1, wherein the plurality of memory devices are secured to one or more memory module.

14. The computer memory system of claim 1, wherein the memory devices are dynamic random access memory devices.

15. The computer memory system of claim 14, wherein the dynamic random access memory devices include multiple stacked dynamic random access memory die.

16. The computer memory system of claim 1, wherein the memory devices are nonvolatile.

17. A memory device, comprising:
   an array of memory cells for storing data;

a plurality of data pins for communicating data with a memory controller over one or more data lane of a memory bus;

a plurality of detection circuits, each detection circuit being coupled to one of the data pins to detect whether the data lane is coupled to one of the lanes of the memory bus;

a data buffer in communication with the array of memory cells for providing data to and from the array of memory cells;

a datapath mapping element coupled between the plurality of data pins and the data buffer for transferring data between the data buffer and the data pins coupled to one of the lanes of the memory bus; and a control circuit coupled to each detection circuit to identify the data pins that are coupled to one of the lanes of the memory bus, and wherein the control circuit is coupled to the datapath mapping element to cause the datapath mapping element to read and write data to the data buffer using a data stream having a bit width that is the same as the number of data pins coupled to one of the lanes of the memory bus.

18. The memory device of claim 17, wherein the control circuit includes a non-volatile memory element for storing information identifying the data pins that are coupled to one of the lanes of the memory bus.

19. The memory device of claim 17, wherein the memory devices are selected from dynamic random access memory devices and non-volatile memory devices.

20. A method, comprising:

a memory controller determining, for each of a plurality of memory devices, a number of memory bus lanes coupled to the memory device, wherein each memory bus lane provides a point-to-point connection between the memory controller and exactly one memory device;

the memory controller determining an addressing scheme as a function of the determined number of memory bus lanes coupled to each memory device; and the memory controller reading and writing data to and from the plurality of memory devices over the determined number of memory bus lanes and using the determined addressing scheme, wherein the memory controller communicates with each memory device without using a chip select signal.

21. The method of claim 20, further comprising:

each memory device identifying a subset of data pins on the memory device that are coupled to one of the lanes of the memory bus; and each memory device buffering data in and out of the memory device according to the number of data pins in the identified subset of data pins.

22. The method of claim 20, further comprising:

the memory controller reading an EEPROM on one or more memory module securing the plurality of memory devices, wherein the EEPROM stores data characterizing the capacity of the memory module.

* * * * *